(12) United States Patent
Kumar

(10) Patent No.: US 6,847,187 B2
(45) Date of Patent: Jan. 25, 2005

(54) DETECTION OF LOSS OF COOLING AIR TO TRACTION MOTORS

(75) Inventor: Ajith Kuttannair Kumar, Erie, PA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 10/755,186

(22) Filed: Jan. 8, 2004

(65) Prior Publication Data

US 2004/0201359 A1 Oct. 14, 2004

Related U.S. Application Data

(63) Continuation of application No. 10/021,910, filed on Dec. 13, 2001, now abandoned.

(51) Int. Cl.[7] .......................... H02H 5/04; H02H 7/08; H02P 1/26; H02P 1/42; H02P 5/28; H02P 7/36
(52) U.S. Cl. ....................... 318/783; 318/471; 318/472; 318/473; 361/23; 361/24; 361/25; 361/27; 361/30; 361/37; 700/79; 700/177; 702/132; 324/772
(58) Field of Search ................. 318/781–783, 318/727, 800–811, 254, 430–434, 471–477, 563–566; 361/1, 23–37, 93.1–97, 103–106, 120, 124; 700/79, 170, 177, 299–301; 702/132, 47, 64; 324/500, 522, 760, 772

(56) References Cited

U.S. PATENT DOCUMENTS

| | | | |
|---|---|---|---|
| 4,083,001 A | * | 4/1978 | Paice .......................... 324/772 |
| 4,467,260 A | | 8/1984 | Mallick, Jr. et al. |
| 5,168,415 A | * | 12/1992 | Osuga .......................... 361/28 |
| 5,298,842 A | * | 3/1994 | Vanek et al. ................. 318/473 |
| 5,436,547 A | * | 7/1995 | Nagai et al. ................. 318/801 |
| 5,446,362 A | | 8/1995 | Vanek et al. |
| 5,451,853 A | * | 9/1995 | Itoh ............................ 318/788 |
| 5,509,881 A | * | 4/1996 | Sharples ........................ 494/7 |
| 5,510,687 A | * | 4/1996 | Ursworth et al. ............ 318/727 |
| 5,712,802 A | * | 1/1998 | Kumar et al. ................ 702/132 |
| 5,721,479 A | * | 2/1998 | Kumar et al. ................ 318/801 |
| 5,826,563 A | | 10/1998 | Patel et al. |
| 5,896,021 A | | 4/1999 | Kumar |
| 6,042,265 A | | 3/2000 | Kliman et al. |
| 6,046,569 A | * | 4/2000 | Formenti ..................... 318/778 |
| 6,178,928 B1 | * | 1/2001 | Corriveau ................ 123/41.12 |
| 6,291,987 B1 | | 9/2001 | Dean et al. |
| 6,294,888 B1 | | 9/2001 | Becker |
| 6,338,026 B2 | * | 1/2002 | Hofmann et al. ............. 702/64 |
| 6,414,832 B1 | * | 7/2002 | Crecelius et al. ........... 361/120 |
| 6,504,358 B1 | * | 1/2003 | Maier et al. ............. 324/158.1 |
| 6,582,119 B2 | * | 6/2003 | Mori et al. .................... 374/45 |
| 6,621,291 B2 | * | 9/2003 | Lee et al. .................... 324/772 |

\* cited by examiner

*Primary Examiner*—David Martin
*Assistant Examiner*—Renata McCloud
(74) *Attorney, Agent, or Firm*—Carl A. Rowold; John L. DeAngelis Jr.; Beusse Brownlee Wolter Mora & Maire P.A.

(57) ABSTRACT

A thermal protection apparatus for an AC traction motor including a stator, a rotor, a blower fan and an inverter includes a method and apparatus for predicting the motor temperature assuming that the blower is operational. The method and apparatus also determines an estimated motor temperature by measuring the motor resistance or the rotor slip. The estimated motor temperatures compared to the predicted motor temperature to determine the condition of the motor cooling system.

16 Claims, 20 Drawing Sheets

FIG. 4A

```
SUB MTP13 (TQFB, VL1, SLIPRPM, TAMB, SFBTM, PWM, DIESELSPD, BSPEED, PAMB, IPHPK, IFIRST, RUNINV)
5614
5616  DATA SUPPLIED TO MTP13
5617
5618   TQFB     : MOTOR AIR GAP TORQUE (FROM INVERTER CONTROL CALCULATIONS) (lbf-ft)
5620   VL1      : DC LINK VOLTAGE (Vdc)
5622   SLIPRPM  : ROTOR SLIP SPEED (rpm)
5624   TAMB     : AMBIENT TEMPERATURE (deg. C)
5626   SFBTM    : TRACTION MOTOR SPEED FEEDBACK (rpm) - SUPPLIED AS UNSIGNED (ALWAYS POSITIVE)
5628   PWM      : SQ. WAVE / PWM BOOLEAN (PWM=1 IMPLIES PWM MODE)
5630   DIESELSPD: ENGINE SPEED (rpm)
5632   BSPEED   : EQUIPMENT BLOWER SPEED STATUS (0=STOP, .5=HALF, 1.0=FULL)
5634   PAMB     : ATMOSPHERIC PRESSURE (psi)
5636   IPHPK    : PEAK VALUE OF FUNDAMENTAL PHASE CURRENT (A-peak)
5637   RUNINV   : INVERTER STATUS BOOLEAN (RUNINV=1 IMPLIES INVERTER POWERED UP, =0 IMPLIES INVERTER POWERED DOWN)
5641
5642  OUTPUT VARIABLES TO LOCOMOTIVE SYSTEM
5643
5644   ATEMPS   : AVERAGE STATOR TEMPERATURE (C)
5646   ATEMPR   : AVERAGE ROTOR CAGE TEMPERATURE (C)
5648   EBSPCM   : EQUIPMENT BLOWER SPEED COMMAND (0=STOP, .5=HALF, 1.0=FULL)
5649   TQLIM    : MOTOR TORQUE LIMIT (lbf-ft)
       R1AVE    : STATOR WDG. RESISTANCE/PHASE - (Ohm) @ "ATEMPS" TEMPERATURE
       R2AVE    : ROTOR CAGE RESISTANCE/PHASE - (Ohm) @ "ATEMPR" TEMPERATURE
5650
5651  PARAMETERS
5652
5654   AEND=2473.03        CPAIR=457.66        C2S=4.1622E+04       GINS=6.3944E+02      HTOZER=120.0         MLC=37.74
5656   AENDR=320.01        COREPU=.50          C3S=1.5719E+04       GINSE=2.6777E+02     HTOZS=90.0           OFFSET=13.491
5658   ALPHA=.00426        CSET1=.00039        C4S=8.8255E+04       G12R=2.2984E+01      KEDDY=1.2527E-05     PIE=3.14159
5660   AROT=2532.92        CSET2=0.0           C5S=2.2543E+05       G23R=2.2984E+01      KHBAR=3.3622         POLES=6.0
5662   AROTX=.13           CSET3=.00039        DT=6.0               G24R=4.7717E+02      KHER=.3355           RHOB=.08074
5664   ASTA=4940.06        CSET4=0.0           EBCONST=2.9762       G12S=2.2634E+01      KHS=6.1804           R10=.00660
5666   ASTAX=.32           CSLL=3.9910E-08     ERTHK=1.10           G23S=2.2634E+01      K1TQ=1.1848E+05      R2BAR=.0064
5668   BAREXT=1.0          C1CFM=.6710         FREQB=21.0           G45S=4.2316E+01      K1TQB=3.8478E+04     R2ER=.0013
5670   CER1=5.3000E-04     C2CFM=.2560         FTOHBAR=40.00        HDIA=.813            K1TQER=1.0848E+02    SK=2.296
5672   CER2=4.2000E-04     C1R=7.0086E+03      FTOHER=140.00        HDIAR=.625           K2TQB=5.0000E+02     SLLPU=.50
5673   CER3=0.0            C2R=1.2716E+05      FTOHS=150.00         HTOFBAR=50.0         K2TQER=5.0000E+02    TINT=40.0
5674   CER4=0.0            C3R=7.0086E+03      FWCOEF=.5207         HTOFER=150.00        LCORE=21.50          VDROP=10
5678   C1=.060             C4R=2.5122E+05      GC3=1.0149E+03       HTOFS=170.0          LEND=8.12            ZTOHBAR=30.0
5679   C2=.187             C1S=1.5719E+04      GCR3=7.5839E+02      HTOZBAR=20.0                              ZTOHER=130.0
5780                                                                                                         ZTOHS=110.0
```

```
5781 ' INITIALIZATION
5782 '
5784    IPH = IPHPK / SQR(2):           ' FUNDAMENTAL PHASE CURRENT - RMS VALUE
5785
5790    IF FIRST > .5 THEN
5791      T1SP = TINIT:           ' INITIAL CONDITIONS
5792      T2SP = TINIT
5793      T3SP = TINIT
5794      T4SP = TINIT
5795      T5SP = TINIT
5796      T6SP = TINIT
5797      T1RP = TINIT
5798      T2RP = TINIT
5799      T3RP = TINIT
5800      T4RP = TINIT
5801      T5RP = TINIT
5803      IFIRST = 0
5804    ELSE
5806      T1SP = T1S
5808      T2SP = T2S
5810      T3SP = T3S
5812      T4SP = T4S
5814      T5SP = T5S
5816      T6SP = T6S
5818      T1RP = T1R
5820      T2RP = T2R
5822      T3RP = T3R
5824      T4RP = T4R
5726      T5RP = T5R
5828    END IF

5840 '
5841 'CALCULATE LOSSES
5902 '
5904    IF RUNINV < 1 THEN
5905      CLOSS = 0
5906      W2 = 0
5907      FW = 0
5908      IPH = 0
5909      LLOSS = 0
5910      WNS1 = 0
5911      WNS2 = 0
5912      WNS3 = 0
5913      WNBAR = 0
5914      WNER1 = 0
5915      WNER2 = 0
5916      SFBTM = .1
5917    ELSE
5918      IF SFBTM < .1 THEN SFBTM = .1:      ' AVOID ZERO DIVIDES @ ZERO RPM
5919      RPMS = SLIPRPM + SFBTM
          IF RPMS < 2 THEN RPMS = 2:          ' AVOID ZERO DIVIDE @ ZERO "RPMS"
          SLIP = 1 -SFBTM/RPMS
```

*FIG. 4B*

```
5920   FREQ = RPMS * POLES / 120:           'SYNCHRONOUS SPEED - (rpm)
5922 '
5923 ' CALCULATE INVERTER TIME HARMONIC LOSSES
5924 '
5925   IF PWM > 0 THEN
5926     VPH = (FREQ / FREQB) * (VL1 - SGN(TQFB)) * VDROP - PIE * OFFSET / SQR(2) * SQR(2) / PIE + OFFSET
5927     WNS1 = 0
5928     WNS2 = 0
5929     WNS3 = 0
5930     WNBAR = 0
5931     WNER1 = 0
5932     WNER2 = 0
5933   ELSE
5934     VPH = (VL1 - SGN(TQFB)) * VDROP - PIE * OFFSET / SQR(2)) * SQR(2) / PIE + OFFSET
5935     WNS1 = KHS * (VPH/FREQ)^2 * (1 + ALPHA * T1SP) * (LEND/MLC):      'STA. WDG. HARM. LOSS (W) @ OP TEMP
5936     WNS2 = KHS * (VPH/FREQ)^2 * (1 + ALPHA * T2SP) * (LCORE/MLC):    'STA. WDG. HARM. LOSS (W) @ OP TEMP
5937     WNS3 = KHS * (VPH/FREQ)^2 * (1 + ALPHA * T3SP) * (LEND/MLC):     'STA. WDG. HARM. LOSS (W) @ OP TEMP
5938     WNBAR = KHBAR * (VPH/FREQ)^2 * SQR(FREQ) * (1 + ALPHA * T2RP):   'ROT. BAR HARM. LOSS(W) @ OP TEMP
5939     WNER1 = KHER * (VPH/FREQ)^2 * (1 + ALPHA * T1RP):                'ROT. END RING HARM. LOSS(INLET END) (W) @ OP TEMP
5940     WNER2 = KHER * (VPH/FREQ)^2 * (1 + ALPHA * T3RP):                'ROT. END RING HARM. LOSS (DISHCARGE END) (W) @ OP TEMP
5941   END IF
5942 '
5943   W2 = TQFB * RPMS * SLIP / 7.0402:
5944   FW = FWCOEF * (SFBTM / 1000^3 * 1000:                              'FUND. SECONDARY ( R (W)
5945   EF = 1 + KEDDY * FREQ^2:                                           'FRICTION + WINDAGE (W)
5946   CLOSS = CL1 * (VPH / FREQ)^2 * FREQ^1.5 + CL2 * SFBTM * (VPH/FREQ)^1.5:  'STATOR SLOT EDDY FACTOR (AVE. FOR SLOT)
5947   LLOSS = CSLL * TQFB^2 * FREQ^SK:                                   'NO-LOAD CORE LOSS (W)
5948                                                                      'STRAY LOAD LOSS - (W)
5949   END IF
5950   W01S = (3 * IPH^2 * R10) * (LEND/MLC):                             'COIL DC LOSS - INLET END (W) @ ZERO DEG. C
5952   W02S = (3 * IPH^2 * R10) * EF * (LCORE/MLC):                       'COIL DC LOSS - CORE @ ZERO DEG. C
5954   W03S = W01S:                                                       'COIL DC LOSS DISCHARGE END (W) - @ ZERO DEG. C
5956   W4S = ((1 - COREPU) * CLOSS + LLOSS * SLLPU):                      'LOSS IN STA. TEETH (W)
5958   W5S = CLOSS * COREPU:                                              'CORE LOSS IN STA. YOKE (W)
5960 '
5962   W1R = W2 * (R2ER / (R234 + R2BAR)) / 2:  'FUND. END RING LOSS @ OPERATING TEMP - (INLET END)
5964   W2R = W2 * (R2BAR / (R2ER + R2BAR)) + (1 - SLLPU) * LLOSS: 'FUND. BAR LOSS @ OPERATING TEMP
5966   W3R = W1R:    'FUND. END RING LOSS @ OPERATING TEMP - (DISCHARGE END)
```

FIG. 4C

```
5970 '
5972  WTOT1 = FW + CLOSS + LLOSS + W2 + W01S * (1 + ALPHA * T1SP) + W02S * (1 + ALPHA * T2SP) + W03S * (1 + ALPHA * T3SP):
       'TOTAL FUND. LOSS (W) @ OPERATING TEMP
5974  WTOTN = WNS1 + WNS2 + WNS3 + WNBAR + WNER1 + WNER2:       'TOTAL HARMONIC LOSS (W)
5976  WTOT = WTOT1 + WTOTN
5980 '
5981 ' CALCULATE AIR FLOW, HEAT X-FER COEFICIENTS & THERMAL CONDUCTANCES
5982 '
5984  SFBEB = EBCONST * DIESELSPD * BSPEED:       'EQUIP. BLWR SPEED (rpm)
5986  IF SFBEB < .1 THEN SFBEB = .1
6002  CFMSTA = C1CFM * SFBEB:       'VOLUMETRIC FLOW RATE - STA. (ft³/min.)
6003  CFMROT = C2CFM * SFBEB:       'VOLUMETRIC FLOW RATE - ROT. (ft³/min.)
```

```
6004  DENAIRS = RHOB * (PAMB / 14.69) * (273 / (273 + T6SP)):    ' AIR DENSITY (LB/FT^3) - STA. CORE
6005  DENAIRR = RHOB * (PAMB / 14.69) * (273 / (273 + T5RP)):    ' AIR DENSITY (LB/FT^3) - ROT. CORE
6006  MDOTS = CFMSTA * DENAIRS / 60:                             ' MASS FLOW RATE - STA. (Lbm/SEC)
6008  MDOTR = CFMROT * DENAIRR / 60:                             ' MASS FLOW RATE - ROT. (Lbm/SEC)
6009  MDOT = MDOTS + MDOTR:                                      ' MASS FLOW RATE - TOTAL (Lbm/SEC)
6010 '
6012  HEND1 = CSET1 * SFBTM^.5 + CSET2 * MDOT:                   ' HEAT TRANSFER COEFF. - INLET END COILS (W/IN^2-C)
6013  HEND2 = CSET3 * SFBTM^.5 + CSET4 * MDOT:                   ' HEAT TRANSFER COEFF. - DISCHARGE END COILS (W/IN^2-C)
6014  HEND1R = CER1 * SFBTM^.5 + CER3 * MDOTR:                   ' HEAT X-FER COEFF. - ROT. END RING (INLET END) (W/IN^2-C)
6015  HEND2R = CER2 * SFBTM^.5 + CER4 * MDOTR:                   ' HEAT X-FER COEFF. - ROT. END RING (DISCHARGE END) (W/IN^2-C)
6016 '
6017  VSTA = CFMSTA / ASTAX:                                     ' STA. DUCT VELOCITY (FT/MIN)
6020  RESTA = DENAIRS * VSTA * HDIA / (720 * .0000134):          ' STA. DUCT REYNOLD'S NO. (MU @ 60C)
6022  HSTA = (1.374 / 1000001) * RESTA^.8 / HDIA:                ' STA. VENT DUCT HEAT TRAN. COEFF. (w/(deg C*in^2)
6025  VROT = CFMROT / AROTX:                                     ' ROT. VENT DUCT VELOCITY (FT/MIN)
6026  REROT = DENAIRR * VROT * HDIAR / (720 * .0000134):         ' ROT. VENT DUCT REYNOLD'S NO.
6028  HROT = (1.374 / 100000) * REROT^.8 / HDIAR:                ' ROT. VENT DUCT HEAT TRANSFER COEFF. (w/(deg C*in^2)
6090 '
6105  G1S = 1 / (1 / (HEND1 * AEND) + 1 / GINSE):                ' THERMAL CONDUCTANCE - STA. COIL END (INLET END)
6110  G3S = 1 / (1 / (HEND2 * AEND) + 1 / GINSE):                ' THERMAL CONDUCTANCE - STA. COIL END (DISCHARGE END)
6120  G1R = HEND1R * AENDR:                                      ' THERMAL CONDUCTANCE - ROT CAGE END (INLET END)
6125  G3R = HEND2R * AENDR:                                      ' THERMAL CONDUCTANCE - ROT CAGE END (DISCHARGE END)
6116  G56S = 1 / (1 / GC3 + 1 / (HSTA * ASTA)):                  ' THERMAL SURF. CONDUCTANCE - STA. COIL END
6118  G45R = 1 / (1 / GCR3 + 1 / (HROT * AROT)):                 ' THERMAL SURF. CONDUCTANCE - ROT CAGE END
6130 '
6135  GAIRS = MDOTS * CPAIR:                                     ' (LB/SEC)*SPECIFIC HEAT - STA. CORE AIR RISE CONDUCTANCE
6140  GAIRR = MDOTR * CPAIR:                                     ' (LB/SEC)*SPECIFIC HEAT - ROT. CORE AIR RISE CONDUCTANCE.
6142  GAIR = MDOT * CPAIR
6150 '
6551 ' CALCULATE TEMPERATURES
6552 '
6586  TEND1 = (T1RP * G1R + T1SP * G1S + TAMB * GAIR + FW / 2) / (G1R + G1S + GAIR)
6587  IF BSPEED < .5 THEN
6588    TEND2 = TEND1:                                           ' PREVENT OVERFLOW IN TEND2 CALC. IF BSPEED = 0
6589  ELSE
6590    TEND2 = WTOT / GAIR + TAMB
6592  END IF
```

6595
6599  T1S = (WD1S * (1 + ALPHA * T1SP) + WNS1 - (G1S + G12S) * T1SP + G12S * T2SP + G1S * TEND1 + C1S * T1SP/DT) * DT/C1S
6600  T2S = (WD2S * (1 + ALPHA * T2SP) + WNS2 + G12S * T1SP - (G23S + G12S +GINS) * T2SP + G23S * T3SP + GINS
       * T4SP + C2S + T2SP/DT) * DT/C2S
6610  T3S = (WD3S * (1 + ALPHA * T3SP) + WNS3 + G23S * T2SP - (G3S + G23S) * T3SP + G3S * TEND2 + C3S * T3SP/DT) * DT/C3S
6620  T4S = (M4S + GINS * T2SP - (GINS + G45S) * T4SP + G45S * T5SP + C4S * T4SP/DT) * DT/C4S
6630  T5S = (M5S + G45S * T4SP - (G45S + G45S) * T5SP + G56S * T6SP + C5S * T5SP/DT) * DT/C5S
6640
6650  T6S = (T5SP + G56S + 2 * GAIRS * TEND1) / (G56S + 2 * GAIRS)

6660  T1R = (W1R + WNER1 - (G1R + G12R) * T1RP + G12R * T2RP + G1R * TEND1 + C1R * T1RP/DT) * DT/C1R
6670  T2R = (W2R + WNBAR - (G23R + G12R + G24R) * T2RP + G12R * T1RP + G23R * T3RP + G24R * T4RP + C2R * T2RP/DT) * DT/C2R
6680  T3R = (W3R + WNER2 - (G3R + G23R) * T3RP + G23R * T2RP + G3R * TEND2 + C3R + T3RP/DT) * DT/C3R
6690  T4R = (G24R * T2RP - (G24R + G45R) * T4RP + G45R) * T4RP + G45R * T5RP + G4R * T4RP/DT) * DT/C4R
6700  T5R = (G45R * T4RP + 2 * GAIRR * TEND1) / (G45R + 2 * GAIRR)
6710  ATEMPS = (T1S * LEND + T2S * LCORE + T3S * LEND) / MLC:
       'AVE. TEMP.- STA.
6712  ATEMPR = (T1R * (ERTHK + BAREXT) + T2R * LCORE + T3R * (ERTHK + BAREXT)) / (LCORE + 2 * BAREXT +2 * ERTHK):
       'AVE. TEMP.- ROT.
6714  DELROT = T3R - T4R:            'DIFFERENTIAL TEMP. BETWEEN ROTOR END RING (DISHCARGE-END) AND ROTOR CORE

*FIG. 4D1*

R1AVE = (1 + ALPHA * ATEMPS) * R10:       'AVE STA. RESISTANCE/PHASE - (Ohm)
R2AVE = (1 + ALPHA * ATEMPR) * (R2BAR + R2ER) * (234.5 + (234.5 + 110)):  'AVE. ROT. CAGE RESISTANCE/PHASE - (Ohm)

DETERMINE BLOWER SPEED

```
IF BSPEED < .5 THEN
    IF T2S > HTOFS THEN
        REQBSPDS = 11
    ELSEIF T2S > ZTOHS THEN
        REQBSPDS = .5
        ELSE REQBSPDS = 0
    END IF
ELSEIF BSPEED < 1 AND BSPEED > 0 THEN
    IF T2S > HTOFS THEN
        REQBSPDS = 11
    ELSEIF T2S < HTOZS THEN
        REQBSPDS = 0
        ELSE REQBSPDS + .5
    END IF
ELSEIF BSPEED > .5 THEN
    IF T2S < HTOZS THEN
        REQBSPDS = 0
    ELSEIF T2S < FTOHS THEN
        REQBSPDS = .5
        ELSE REQBSPDS = 11
    END IF
END IF
```

STATOR WDG. BLOWER SPEED

*FIG. 4E*

ROTOR END RING BLOWER SPEED

```
IF BSPEED < .5 THEN
    IF T3R > HTOFER THEN
        REQBSPDER = 11
    ELSEIF T3R > ZTOHER THEN
        REQBSPDER = .5
        ELSE REQBSPDER = 0
    END IF
ELSEIF BSPEED < 1 AND BSPEED > 0 THEN
    IF T3R > HTOFER THEN
        REQBSPDER = 11
    ELSEIF T3R < HTOZER THEN
        REQBSPDER = 0
        ELSE REQBSPDER = .5
    END IF
ELSEIF BSPEED > .5 THEN
    IF T3R < HTOZER THEN
        REQBSPDER = 0
    ELSEIF T3R < FTOHER THEN
        REQBSPDER = .5
        ELSE REQBSPDER = 11
    END IF
END IF
```

*FIG. 4F*

ROTOR BAR STRESS BLOWER SPEED

```
IF BSPEED < .5 THEN
   IF ABS(DELROT) > HTOFBAR THEN
      REQBSPDBAR = 1I
   ELSEIF ABS(DELROT) > ZTOHBAR THEN
      REQBSPDBAR = .5
      ELSE REQBSPDBAR = 0
   END IF
ELSEIF BSPEED < 1 AND BSPEED > 0 THEN
   IF ABS(DELROT) > HTOFBAR THEN
      REQBSPDBAR = 1I
   ELSEIF ABS(DELROT) < HTOZBAR THEN
      REQBSPDBAR = 0
      ELSE REQBSPDBAR = .5
   END IF
ELSEIF BSPEED > .5 THEN
   IF ABS(DELROT) < HTOZBAR THEN
      REQBSPDBAR = 0
   ELSEIF ABS(DELROT) < FTOHBAR THEN
      REQBSPDBAR = .5
      ELSE REQBSPDBAR = 1I
   END IF
END IF
```

DETERMINE LIMITING CASE BLOWER SPEED

```
IF REQBSPDS >= REQBSPDER AND REQBSPDS >= REQBSPDBAR THEN
   EBSPCM = REQBSPDS
ELSEIF REQBSPDER >= REQBSPDS AND REQBSPDER >= REQBSPDBAR THEN
   EBSPCM = REQBSPDER
ELSEIF REQBSPDBAR >= REQBSPDS AND REQBSPDBAR >= REQBSPDER THEN
   EBSPCM = REQBSPDBAR
END IF
```

CALCULATE TORQUE LIMITS & DERATION

TQLIMS = SGN(TQFB) * (K1TQ - K2TQ * T2S):     ' TORQUE LIMIT IMPOSED BY
                                                STA. COPPER TEMP.

TQLIMER = SGN(TQFB) * (K1TQER - K2TQER * T3R):  ' TORQUE LIMIT IMPOSED BY
                                                  ROT. END RING TEMP.

TQLIMB = SGN(TQFB) * (K1TQB - K2TQB * ABS(DELROT)):  ' TORQUE LIMIT IMPOSED BY
                                                       ROT. BAR EXT. STRESS

```
IF ABS(TQLIMS) <= ABS(TQLIMER) AND ABS(TQLIMS) <= ABS(TQLIMB) TEHN
   TQLIM = TQLIMS
ELSEIF ABS(TQLIMER) <= ABS(TQLIMS) AND ABS(TQLIMER) <= ABS(TQLIMB) THEN
   TQLIM = TQLIMER
ELSEIF ABS(TQLIMB) <= ABS(TQLIMS) AND ABS(TQLIMB) <= ABS(TQLIMER) THEN
   TQLIM = TQLIMB
END IF
```

*FIG. 4G*

- AEND : SURF. AREA OF STATOR COIL END TURNS (In^2)

- AENDR : SURF. AREA OF ROTOR CAGE END - (In^2)

- ALPHA : 1 / 234.5 (reciprocal of the Inferred absolute zero for stator copper)

- AROT : TOTAL ROT. DUCT SURFACE AREA FOR HEAT X-FER - (In^2)

- AROTX : TOTAL ROT. DUCT X-SECT PER MACHINE - (ft^2)

- ASTA : TOTAL STA. DUCT SURFACE AREA FOR HEAT X-FER - (in^2)

- ASTAX : TOT. STA. DUCT X-SECT (ft^2)

- BAREXT : ROTOR BAR EXTENSION (ONE END) - (in.)

- CER1 : ROTOR END AREA HEAT X-FER FACTOR (INLET END) - ROTOR SPEED COMPONENT

- CER2 : ROTOR END AREA HEAT X-FER FACTOR (DISCHARGE END) - ROTOR SPEED COMPONENT

- CER3 : ROTOR END AREA HEAT X-FER FACTOR (INLET END) - CORE AIR FLOW COMPONENT
  - ([W/in^2-C]/[lbm/sec])

- CER4 : ROTOR END AREA HEAT X-FER FACTOR (DISCHARGE END) - CORE AIR FLOW COMPONENT
  - ([W/in^2-C]/[lbm/sec])

- CL1 : CORE LOSS COEFF. - FUND. FREQ. LOSS

- CL1 : CORE LOSS COEFF. - PULSATION LOSS

- CPAIR : SPECIFIC HEAT OF AIR - (W-sec)/(lbm-C)

- COREPU : (STA YOKE CORE LOSS)/(TOTAL CORE LOSS)

- CSET1 : STA. END TURN HEAT X-FER FACTOR (ROTOR SPEED COMPONENT) - INLET END

- CSET2 : STA. END TURN HEAT X-FER FACTOR (THRU-AIR COMPONENT) - INLET END
  - ([W/in^2-C]/[lbm/sec])

*FIG. 4H*

| | |
|---|---|
| 'CSET3 | : STA. END TURN HEAT X-FER FACTOR (ROTOR SPEED COMPONENT) - DISCHARGE END |
| 'CSET4 | : STA. END TURN HEAT X-FER FACTOR (THRU-AIR FLOW COMPONENT) - DISCHARGE END - ([W/in^2-C]/[lbm/sec]) |
| 'CSLL | : SLL COEFF. |
| 'C1CFM | : STATOR CORE CFM FRACTION - (stacfm/EBrpm) |
| 'C2CFM | : ROTOR CORE CFM FRACTION - (rotcfm/EBrpm) |
| 'C1R | : HEAT CAPACITY - ROTOR END RING (INLET END) - (W-sec/C) |
| 'C2R | : HEAT CAPACITY - ROTOR BARS - (W-sec/C) |
| 'C3R | : HEAT CAPACITY - ROTOR END RING (DISCHARGE END - (W-sec/C) |
| 'C4R | : HEAT CAPACITY - ROTOR CORE - (W-sec/C) |
| 'C1S | : HEAT CAPACITY - STATOR COIL END TURNS (INLET END) - (W-sec/C) |
| 'C2S | : HEAT CAPACITY - STATOR COIL SLOT PORTION - (W-sec/C) |
| 'C3S | : HEAT CAPACITY - STATOR COIL END TURNS (DISCHARGE END) - (W-sec/C) |
| 'C4S | : HEAT CAPACITY - STATOR TEETH - (W-sec/C) |
| 'C5S | : HEAT CAPACITY - STATOR YOKE - (W-sec/C) |
| 'DT | : INTEGRATION INTERVAL - (sec) |
| 'EBCONST | : EQUIPMENT BLOWER CONSTANT - (EBrpm/DIESELrpm) |
| 'ERTHK | : AXIAL THKNESS OF ROTOR CAGE END RING - (In.) |
| 'FREQB | : FREQUENCY @ PWM CORNER POINT - (Hz) |
| 'FTOHBAR | : ROT. END RING/CORE DIFFERENTIAL TEMP. BLOWER TRANSITION TEMP. - FULL TO 1/2 SPEED (C) |
| 'FTOHER | : ROT. END RING BLOWER TRANSITION TEMP. - FULL TO 1/2 SPEED (C) |

FIG. 4l

| | |
|---|---|
| • FTOHS | : STA. WDG. BLOWER TRANSITION TEMP. - FULL TO 1/2 SPEED (C) |
| • FWCOEF | : F&W COEFFICIENT (FORT WAYNE FORMULA) |
| • GC3 | : THERMAL CONDUCTANCE - STATOR CORE - (W/C) |
| • GCR3 | : THERMAL CONDUCTANCE - ROTOR CORE - (W/C) |
| • GINS | : THERMAL CONDUCTANCE - STATOR SLOT COIL INSULATION - (W/C) |
| • GINSE | : THERMAL CONDUCTANCE - STATOR COIL END TURN INSULATION - (W/C) |
| • G12R | : THERMAL CONDUCTANCE BETWEEN NODE 1 & 2 - ROTOR BAR - (W/C) |
| • G23R | : THERMAL CONDUCTANCE BETWEEN NODE 2 & 3 - ROTOR CORE - (W/C) |
| • G24R | : THERMAL CONDUCTANCE BETWEEN NODE 2 & 4 - ROTOR CORE - (W/C) |
| • G12S | : THERMAL CONDUCTANCE BETWEEN NODE 1 & 2 - STATOR COIL- (W/C) |
| • G23S | : THERMAL CONDUCTANCE BETWEEN NODE 2 & 3 - STATOR CORE- (W/C) |
| • G45S | : THERMAL CONDUCTANCE BETWEEN NODE 4 & 5 - STATOR CORE- (W/C) |
| • HDIA | : HYDRAULIC DIAMETER OF STATOR VENT DUCT - (in.) |
| • HDIAR | : HYDRAULIC DIAMETER OF ROTOR VENT DUCT - (in.) |
| • HTOFBAR | : ROT. END RING/CORE DIFFERENTIAL TEMP. BLOWER TRANSITION TEMP. - 1/2 TO FULL SPEED (C) |
| • HTOFER | : ROT. END RING BLOWER TRANSITION TEMP. - 1/2 TO FULL SPEED (C) |
| • HTOFS | : STA. WDG. BLOWER TRANSITION TEMP. - 1/2 TO FULL SPEED (C) |
| • HTOZBAR | : ROT. END RING/CORE DIFFERENTIAL TEMP. BLOWER TRANSITION TEMP. - 1/2 TO ZERO SPEED (C) |
| • HTOZER | : ROT. END RING BLOWER TRANSITION TEMP. - 1/2 TO ZERO SPEED (C) |
| • HTOZS | : STA. WDG. BLOWER TRANSITION TEMP. - 1/2 TO ZERO SPEED (C) |

*FIG. 4J*

| | |
|---|---|
| 'KEDDY | : CONSTANT USED IN STATOR SLOT EDDY FACTOR CALCULATION |
| 'KHBAR | : ROT. BAR TIME HARMONIC LOSS COEFF. - DEFINED AT ZERO C |
| 'KHER | : ROT. CAGE END RING TIME HARMONIC LOSS COEFF. (PER END RING) - DEFINED AT ZERO C |
| 'KHS | : STA. WDG. TIME HARMONIC LOSS COEFF. - DEFINED AT ZERO C |
| 'K1TQ | : STA. WDG. DERATING FACTOR (220C IS S.S. LIMIT) - (lbf-ft) |
| 'K1TQB | : ROT. BAR EXT. STRESS DERATING FACTOR (50C IS S.S. LIMIT) - (lbf-ft) |
| 'K1TQER | : ROT. END RING DERATING FACTOR (200C IS S.S. LIMIT) - (lbf-ft) |
| 'K2TQ | : STA. WDG. DERATING FACTOR - (lbf-ft/C) |
| 'K2TQB | : ROT. BAR EXT. STRESS DERATING FACTOR - (lbf-ft/C) |
| 'K2TQER | : ROT. END RING DERATING FACTOR - (lbf-ft/C) |
| 'LCORE | : CORE LENGTH - (In.) |
| 'LEND | : AXIAL LENGTH OF COIL END TURN/END - (In.) |
| 'MLC | : MEAN LENGTH OF COIL - (In.) |
| 'OFFSET | : INVERTER VOLTAGE OFF-SET @ ZERO SPEED - (Vph-rms) |
| 'PIE | : 3.14159 |
| 'POLES | : NUMBER OF MOTOR POLES |
| 'RHOB | : DENSITY OF AIR @ SEA LEVEL & ZERO C - (lbm/ft^3) |
| 'R10 | : STATOR WDG. RESISTANCE/PHASE @ ZERO C - (Ohm) |
| 'R2BAR | : ROTOR CAGE RESISTANCE @ 110 C - BAR CONTRIBUTION ONLY - (Ohm) |
| 'R2ER | : ROTOR CAGE RESISTANCE @ 110 C - END RING CONTRIBUTION ONLY - (Ohm) |

*FIG. 4K*

'SK         : SLL FREQ. EXPONENT

'SLLPU      : (STA TEETH SLL)/(TOTAL SLL)

'TINIT      : INITIAL TEMPERATURE (C)

'VDROP      : INVERTER VOLTAGE DROP (Vdc)

'ZTOHBAR    : ROT.END RING/CORE DIFFERENTIAL TEMP. BLOWER TRANSITION TEMP. -ZERO TO 1/2 SPEED (C)

'ZTOHER     : ROT. END RING BLOWER TRANSITION TEMP. -ZERO TO 1/2 SPEED (C)

'ZTOHS      : STA. WDG. BLOWER TRANSITION TEMP. -ZERO TO 1/2 SPEED (C)

DICTIONARY - OUTPUT VARIABLES TO LOCOMOTIVE CONTROL SOFTWARE

'ATEMPR     : AVERAGE ROTOR CAGE TEMPERATURE (C)

'ATEMPS     : AVERAGE STATOR TEMPERATURE (C)

'EBSPCM     : EQUIPMENT BLOWER SPEED COMMAND (0=STOP, .5=HALF, 1.0=FULL)

'R1AVE      : STATOR WDG. RESISTANCE/PHASE - (Ohm) @ "ATEMPS" TEMPERATURE

'R2AVE      : ROTOR CAGE RESISTANCE/PHASE - (Ohm) @ "ATEMPR" TEMPERATURE

'TQLIM      : MOTOR TORQUE LIMIT - LIMITING CASE - (lbf-ft)

*FIG. 4L*

DICTIONARY - OUTPUT VARIABLES FOR DIAGNOSTIC PURPOSES

'REQBSPDBAR : EQUIPMENT BLOWER SPEED REQUEST - ROT. CAGE BAR EXT. STRESS - (0=STOP, .5=HALF, 1.0=FULL)

'REQBSPDER : EQUIPMENT BLOWER SPEED REQUEST - ROT. CAGE END RING (DISCHARGE END) - (0=STOP, .5=HALF, 1.0=FULL)

'REQBSPDS : EQUIPMENT BLOWER SPEED REQUEST - STA. COIL (CORE PORTION) - (0=STOP, .5=HALF, 1.0=FULL)

'TQLIMB : MOTOR TORQUE LIMIT - ROT. CAGE BAR EXT. STRESS - (lbf-ft)

'TQLIMER : MOTOR TORQUE LIMIT - ROT. CAGE END RING (DISCHARGE END) - (lbf-ft)

'TQLIMS : MOTOR TORQUE LIMIT - STA. COIL (CORE PORTION) - (lbf-ft)

DELROT : DIFFERENTIAL TEMP. (ROT. END RING - ROT. CORE) - (deg. C)

'T2S : STA. COIL TEMP. (CORE PORTION) - (deg. C)

'T3R : ROT. END RING TEMP. (DISCHARGE END) - (deg. C)

'SLIP : ROTOR SLIP - (Per Unit)

*FIG. 4M*

DETECTION OF LOSS OF COOLING AIR TO TRACTION MOTORS

The Application is a continuation of application Ser. No. 10/021,910 filed on Dec. 13, 2001 now abandoned.

The disclosure of this patent document contains material that is subject to copyright protection. The copyright owner has no objection to the copying by anyone of the patent document or the patent disclosure as it appears in the Patent and Trademark Office patent files or records, but otherwise reserves all copyrights whatsoever.

BACKGROUND OF THE INVENTION

The present invention is directed in general to an apparatus and method for detecting the loss of cooling air to traction motors, and more specifically to an apparatus and method comparing the predicted motor temperature (assuming a proper supply of cooling air to the traction motors) and the estimated motor temperature (as determined by certain temperature estimation processes since there are no temperature sensors on the motors) to determine whether cooling air is being supplied to the traction motors.

Alternating current (AC) traction motors are conventionally used in conjunction with electronic inverter drives to provide propulsion to locomotives, off-highway vehicles, and transit cars. These motors are generally induction motors controlled by pulse width modulating inverters. The variable frequency, variable voltage inverters are fed with direct current (DC) from a DC source or from a rectified AC source. The inverters control the amplitude and frequency of the voltage applied to the induction motors to produce the necessary motor flux and torque.

The traction motor is capable of operating outside its continuous operational envelope for a short period of time to deliver the power/torque required to meet short term loads. However, continuous operation outside these limits causes motor over-heating, which reduces motor life expectancy. It is therefore necessary to include a thermal protection system to prevent damage to the stator winding insulation system and the rotor cage of the traction motor.

Current monitoring and overload protection for rotating electrical machinery can prevent excessive overheating of the electrical winding system. Embedded winding current sensors are used in conventional thermal protection schemes, and the winding temperature is inferred from the winding current. Alternatively, rotating machines used in industrial applications employ resistance temperature detectors embedded in the stator windings to directly sense the stator winding temperatures. Whether the temperature is determined from the current flow or measured directly, the machine is shut down if the temperature rises above a predetermined threshold.

However, AC traction motors have historically not used temperature sensors to determine the actual winding temperature, because the location of the motor exposes the sensors and associated cabling to high vibration forces, impact with track and road debris and other hostile environmental conditions. The possibility of false indications or damage to the sensors creates a system reliability issue and therefore discourages the use of embedded winding sensors. However, in an effort to maintain the traction motors at an acceptable and safe temperature, cooling air is directed from a blower motor to the traction motors. The motor winding temperature is predicted based on a thermal model of the motor, and using the blower motor speed, ambient conditions, traction motor speed, current and voltage, and other parameters that can affect the traction motor temperature. Unfortunately, failure of the blower motor, a breach in the air duct directing the cooling air to the traction motors or the failure of other cooling system components may cause the motor temperature to increase to an unacceptable limit, a condition that may not be easily detected according to the prior art.

BRIEF SUMMARY OF THE INVENTION

The present invention offers an improved apparatus and method for detecting an overheating condition on the traction motors. A motor thermal protection algorithm calculates the expected or predicted motor temperature based on the assumption that the blower is running at the commanded speed and that cooling air is flowing to the traction motors. The algorithm uses the expected cooling air flow rates based on the commanded blower speed and further measures the ambient air temperature and pressure to predict the motor temperature. If the predicted traction motor temperature exceeds a predetermined limit, the blower speed can be increased to supply more cooling air, the motor speed can be reduced, or the motor can be shut down. In certain circumstances the algorithmic assumptions may not be valid due to a failure in the blower system, such as a blower motor failure or a leak in the flexible hose duct through which cooling air is directed to the traction motors. For example, after the completion of maintenance work on the vehicle, maintenance personnel may forget to reconnect the cooling system duct and therefore no cooling air will be supplied to a traction motor. But because the motor protection algorithm does not measure cooling air flow, the algorithm cannot take this condition into account. As a result, the lack of cooling air flow is not detected and the motors may overheat.

Further to the present invention, the motor temperature is estimated by injecting single phase AC (applying three-phase AC current may cause the locomotive to move and thus is to be avoided) or DC current into the windings and measuring the winding resistance, from which the winding temperature can be calculated. This process is executed while the vehicle is stopped. Alternatively, an average rotor resistance value can also be obtained while the vehicle is running from an analysis of the rotor slip and torque. Once a resistance value is obtained, the winding temperature can be calculated from it. The resulting temperature estimate is compared to the predicted motor temperature, as determined from the motor thermal protection algorithm discussed above, to determine if the cooling system is functioning properly. In accordance with the present invention, if the temperature predicted by the motor thermal protection algorithm is substantially lower than the estimated temperature derived from the winding resistance, then it can be assumed that the traction motors are not receiving cooling air and thus are exposed to excessive temperatures that can cause motor damage. In response, motor shutdown or derating may be required. Advantageously, according to the teachings of the present invention, the winding resistance values can be obtained without the need to add sensors, connectors or wires to the traction motors. Instead the resistance is determined using existing stable connections to the traction motors.

BRIEF DESCRIPTION OF THE DRAWINGS

The present invention can be more easily understood and the further advantages and uses thereof more readily apparent, when considered in view of the description of the preferred embodiments and the following figures in which:

FIG. 4A through 4G include computer source code listings to calculate the motor temperatures;

FIGS. 4h through 4m are a dictionary of parameters used in a computer source code of FIGS. 4A through 4G;

DETAILED DESCRIPTION OF THE INVENTION

Figure 1:
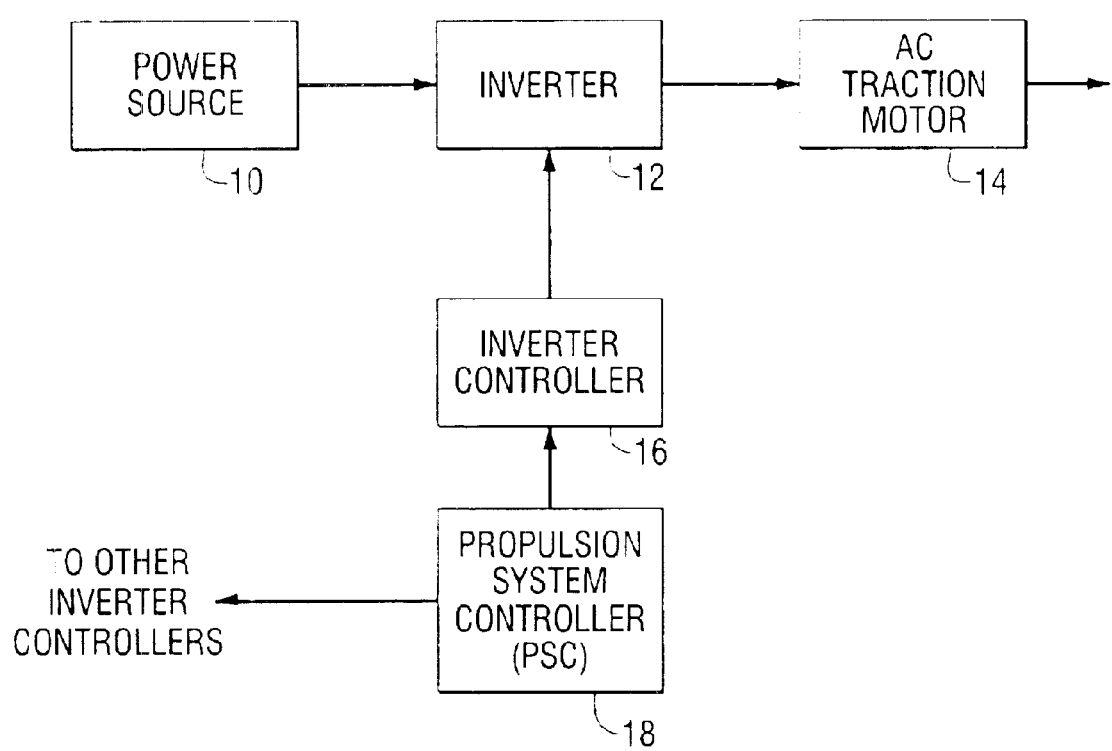
FIG. 1 is a block diagram depicting the basic elements of a vehicle AC propulsion system.

Before describing in detail the particular method and apparatus for detecting the loss of cooling air flow to a traction motor in accordance with the present invention, it should be observed that the present invention resides primarily in a novel combination of steps and hardware related to detecting the loss of cooling air flow on a traction motor. Accordingly, the hardware components and method steps have been represented by conventional elements in the drawings, showing only those specific details that are pertinent to the present invention so as not to obscure the disclosure with structural details that will be readily apparent to those skilled in the art having the benefit of the description herein.

FIG. 1 is a block diagram depicting elements of a vehicle AC propulsion system. A vehicle power source 10 comprises a power source including for example, a diesel engine with a traction alternator, a battery or a wayside power source such a third rail or a high voltage catenary. Generally, these sources provide DC power that is conditioned by an inverter 12, under control of an inverter controller 16, to regulate the amplitude and the frequency of the of the voltage supplied to an AC traction motor 14 in a manner consistent with the needs of the vehicle load. Typically, the vehicle is driven by a plurality of AC traction motors, requiring attendant inverters and inverter controllers if a DC source is used. The inverter controller 16 is controlled by a propulsion system controller 18, in response to various operational parametric conditions of the vehicle (e.g. temperature, pressure) and a throttle signal generated by manual control of a throttle handle by the vehicle operator.

Figure 2:
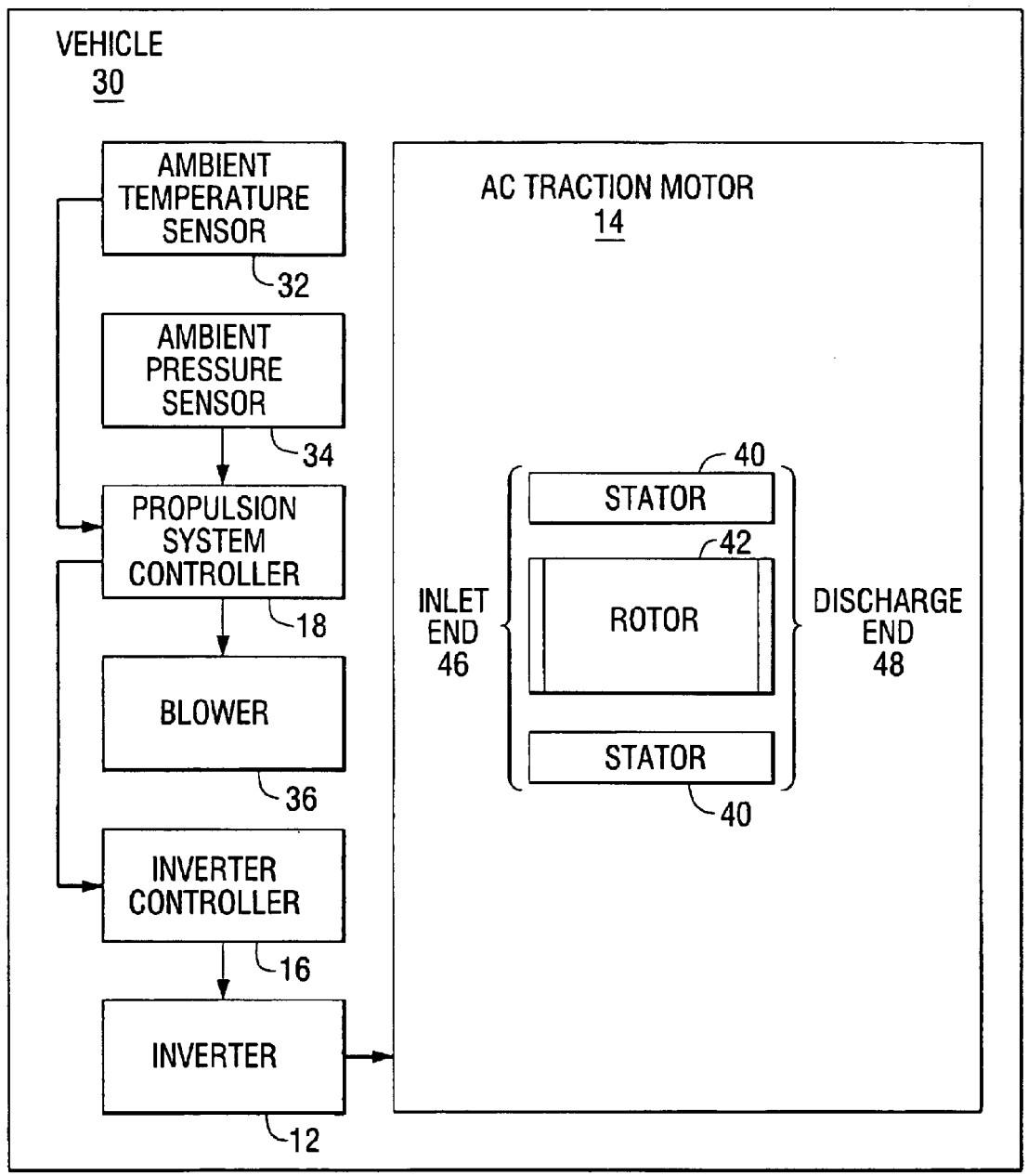
FIG. 2 is a block diagram of those elements of a vehicle utilizing the teachings of the present invention.

As is shown in FIG. 2 a vehicle 30 includes an ambient temperature sensor 32 and an ambient pressure sensor 34 providing respective ambient temperature and pressure values to the propulsion system controller 18. In addition to controlling the propulsion system of the vehicle 30, the propulsion system controller controls a blower 36 for providing cooling air to the plurality of AC traction motors 14, including the stator 40 and the rotor 42 thereof. The stator 40 and the rotor 42 are shown in block diagram form in FIG. 2. Cooling air is provided to the AC traction motor 14 via an inlet end 46 and discharged therefrom at a discharge end 48.

Figure 3:
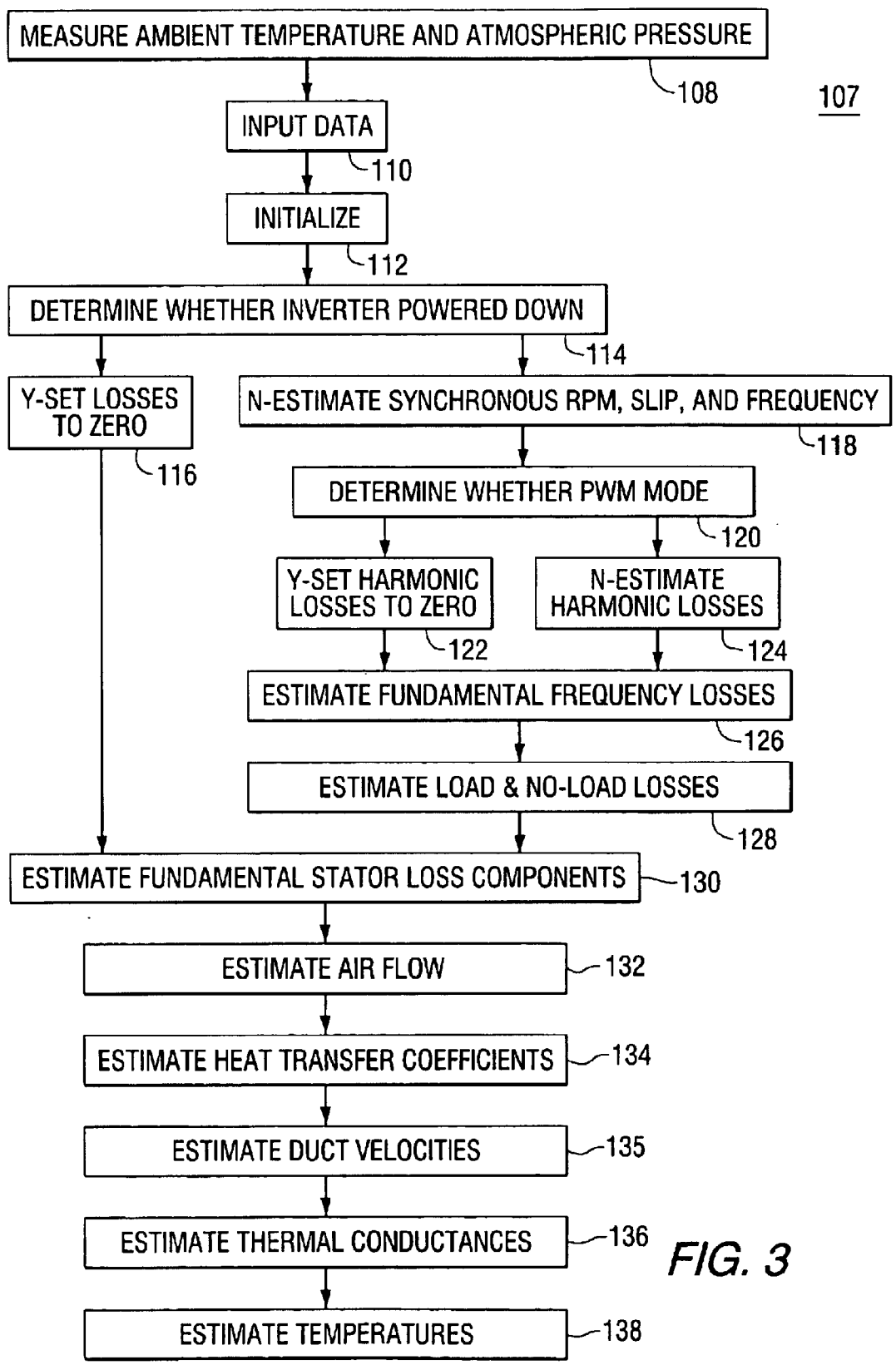
FIG. 3 is a flow chart illustrating the steps in the thermal protection algorithm according to the teachings of the present invention.

FIG. 3 is a flow chart illustrating the steps of a motor thermal protection algorithm 107 of the present invention, from which the predicted traction motor temperature is derived. This thermal protection algorithm is described and claimed in commonly assigned U.S. Pat. No. 5,446,362, which is herein incorporated by reference. In one embodiment of the present invention, the thermal protection algorithm 107 is executed by an onboard microprocessor within the propulsion system controller 18. The results derived from the motor thermal protection algorithm 107 affect the propulsion system controller 18 and thereby the inverter controller 16, to effect a smooth and gradual reduction in motor torque and therefore in vehicle tractive effort, to limit the motor temperature to a predetermined value. There is no abrupt change or loss of vehicle tractive effort and the AC traction motor 14 is not necessarily and abruptly disconnected from a power source as is often done in conventional thermal protection systems.

Upon activation of the inverter 12 for powering the traction motor 14, the ventilating air ambient temperature (TAMB in C °) and the atmospheric pressure (PAMB in psi) of the ventilating air are measured in the ambient environment in which the motor is operated, by the ambient temperature sensor 32 and the ambient pressure sensor 34 of FIG. 2. In one embodiment ambient temperature is measured by a thermocouple and ambient pressure is measured with a barometric pressure transducer.

Returning to FIG. 3, at an input step 110, the measured ambient temperature and atmospheric pressure, as well as the following additional vehicle system values, are supplied to the motor thermal protection algorithm 107. Those skilled in the art will recognize that these parameters are also used by the propulsion system controller 18. See, for example, commonly assigned U.S. Pat. No. 5,826,563.

TQFB: motor air gap torque (derived by inverter controller 16 in lb.-ft)

VL1: inverter DC link voltage in volts DC

SLIPRPM: rotor slip speed in rpm

SFBTM: traction motor speed feedback in rpm

PWM: inverter mode (1 implies pulse width modulation mode)

DIESELSPD: engine speed in rpm

BSPEED: blower speed status (0=stopped, 0.5=half speed, and 1=full speed)

IPHPK: fundamental phase current peak in amps

RUNIV: inverter status (a Booleon 1 implies an active inverter)

In a preferred embodiment, the motor thermal protection algorithm 107 calculates and stores a plurality of predicted temperatures for different points on the stator 40 and the rotor 42, and also for the regions surrounding the inlet end 46 and the discharge end 48. In one embodiment there are six stator winding nodes for which temperature values are calculated (T1SP, T2SP, ... T6SP) and five rotor core nodes for which temperature values are calculated (T1RP, T2RP, ... T5RP). In those applications where there are multiple traction motors on a vehicle, the temperature will typically be predicted for rotor and stator points on each traction motor.

At a step 112 of the thermal protection algorithm, the initial temperature variables are set and the phase current RMS value is calculated by dividing the input the value of IPHPK (peak value of the fundamental phase current) by the square root of 2. At the step 112, it is also determined whether the motor thermal protection algorithm 107 must be initialized with initial condition temperature values for the various rotor and stator nodes. For the first execution of the motor thermal protection algorithm 107 the initial values for the rotor and stator nodes are assumed to be the ambient temperature. For subsequent executions the last calculated nodal temperature values are used to calculate the initial condition nodal temperatures according to equation (1) below. A battery provides continual power to retain the last nodal temperatures in memory. These stored temperature values are then used to calculate the initial condition temperatures, using equation (1) below, for the next execution of the motor thermal protection algorithm 107.

$$T_{INT}=(T_p-Tamb_p)(\exp-(t/\text{const})+Tamb) \quad (1)$$

Where $T_p$ is the previous temperature as stored immediately prior to shut down of the propulsion system controller 18, $T_{AMB}$ is the present ambient temperature, $TAMB_p$ is the previous ambient temperature, t is the elapsed time in minutes since the propulsion system controller 18 has been without power, and "const" is the machine thermal time constant in minutes, assuming a rotor is at rest with no ventilation. The time constant, which varies with motor size, is 34.6 minutes in one embodiment. A $T_{INT}$ value is calculated for each stator and rotor node.

Returning to FIG. 3, at a step 114, the RUNINV value determines whether the inverter 12 is active and thereby a load on the engine of the vehicle 30. If RUNINV is less than one (i.e., indicating that the inverter 12 is not loading the system) then at a step 116 each of the following simulation loss values is set to zero:

CLOSS (no load core loss),
W2 (fundamental secondary power (IR) loss)
FW (friction and windage loss)
IPH (RMS value of motor phase current)
LLOSS (stray load loss)
WNS1, WNS2 and WNS3 (stator winding harmonic losses)
WNBAR (rotor bar harmonic loss)
WNER1 (rotor end ring harmonic loss at the inlet end 46)
WNER2 (rotor end ring harmonic loss at the discharge end 48)
SFBTM (traction motor speed feedback) is set to a finite value less than or equal to 0.1 to prevent divisions by zero. The algorithm then proceeds directly to a step 130.

If at the step 114 RUNINV is 1, then at a step 118, the synchronous rpm (RPMS) is calculated by adding the input signal magnitude of SLIPRPM (rotor slip speed in rpm) and SFBTM (traction motor speed feedback in rpm) (which is set to a finite value such as 0.1 if the actual value is less than a predetermined finite value). If the synchronous RPM valve is less than a predetermined value then it is set to that predetermined value for the purpose of avoiding division by zero. Any small number less than or equal to approximately 2 can be used as the predetermined value. Additionally, at the step 118, the SLIP value is calculated by subtracting SFBTM/RPMS from 1. The frequency (FREQ) is calculated by multiplying RPMS by the number of poles and dividing by 120.

It is noted that the inverter mode can be either pulse modulation or square wave modulation. At a step 120, the pulse width modulation input value is used to determine which mode is present. If the PWM value is greater than zero, then the inverter 12 is in the PWM mode. Therefore, at a step 122 the phase voltage is calculated, without harmonics, using the equation of line 5926 in FIGS. 4A through 4G. The stator, rotor bar and rotor end-ring harmonic losses are set equal to zero. It is known by those skilled in the art the equation shown in the algorithm of FIGS. 4A through 4G are all for the purposes of example only. There are a number of techniques for modeling the losses and the other relevant parameters, and the invention is therefore not limited to the specific techniques shown in FIGS. 4A through 4G.

If the PWM value is not greater than zero, then the inverter 12 is in the square wave mode. At a step 124 the phase voltage is calculated with harmonics and the stator winding, rotor bar and rotor end ring harmonic losses are calculated using the equations of lines 5934–5940 of FIGS. 4A through 4G.

Regardless of whether the inverter 12 is in the pulse width modulation or square wave modulation mode, at a step 126 the fundamental secondary power, or $I^2$ loss, the friction and windage loss and the average stator slot eddy factor are calculated using the equations of lines 5943 to 5945 of FIGS. 4A through 4G.

At a step 128, the no-load core loss and the stray load loss are calculated using the equations of lines 5947 to 5948 of FIGS. 4A through 4G.

Regardless of whether the inverter 12 is active or powered down, processing then executes a step 130 where the individual stator, bar and end ring fundamental losses are calculated and the combination of total harmonic and fundamental losses are calculated using the equations in lines 5950 to 5976 to FIGS. 4A through 4G.

At a step 132, air density adjustments due to altitude and ambient temperature variations are made to better estimate air mass flow rates. First, the speed of the blower 36 (SFBEB) is calculated by multiplying the motor's equipment blower constant by the engine speed input parameter and the blower speed input parameter. If SFBEB is less than a predetermined finite value, such is 0.1 rpm, then SFBEB is set to that predetermined value. The volumetric flow rates of the stator and rotor are calculated by multiplying SFBEB by the motor stator core cfm (cubit feet per minute) fraction and rotor core cfm fraction, respectively. The air density calculations that are used to calculate the mass flow rates consider the prevailing ambient pressure and the rotor core duct and stator core duct air temperature, using the equations in lines 6004 to 6009 in FIGS. 4A through 4G.

At a step 134, the heat transfer coefficients are calculated. The heat transfer coefficients of the stator end windings and rotor end rings are assumed to be functions of rotor speed, and mass flow rate through the stator and rotor cores, and are calculated in accordance with the equation in lines 6012 to 6015 of FIGS. 4A through 4G.

At a step 135 the rotor and duct air velocities (in feet per minute), Reynold's numbers and duct heat transfer coefficients are calculated using the equations in lines 6017 to 6028 of FIGS. 4A through 4G. The duct Reynold's numbers are adjusted for air density changes.

At a step 136, thermal conductances are calculated for the stator end coils and the rotor cage ends using the equations of line 6105 to 6128. Stator, rotor, and total core air rise conductances are calculated by multiplying the specific heat with the respective mass flow rate as shown in lines 6135 to 6142 of FIGS. 4A through 4G.

At a step 138, the air temperature at the inlet and outlet ends of the motor, the stator and the rotor nodal temperatures, the stator and rotor average temperatures and the average stator and rotor resistances are calculated as follows.

The temperature at the inlet end 46 of the motor is calculated using the formula in line 6586 of FIGS. 4A through 4G. To determine the temperature of the discharge end 48, the input value of BSPEED is evaluated. If BSPEED is less than 0.5, then the outlet end 48 air temperature is set equal to the inlet end 46 air temperature because the blower 36 is off. If BSPEED is not less than 0.5, then the air temperature at the outlet end 48 of the motor 14 is calculated using the total fundamental and harmonic losses, the total air rise conductance and the ambient air temperature as shown in the equation of 6590 of FIGS. 4A through 4G.

In one embodiment, the stator and rotor nodal temperatures are calculated with numerical integration of the system differential equations. For example, numerical integration methods such as Runge-Kutta methods or, as shown in line 6595–6770 in FIGS. 4A to 4G, Euler's method can be used. The rotor and stator average temperatures and the rotor end ring and the rotor core differential temperatures are calculated using the equations in line 6710 to 6714 of FIGS. 4A through 4G. The average rotor and stator resistances per phase are then calculated using motor specific constants and the calculated average rotor and stator temperatures.

In accordance with the teachings of the present invention, the temperatures predicted at the step 138 of the motor thermal protection algorithm 107 are compared to the estimated motor temperatures, which are determined as described below, to determine the possible existence of a cooling system malfunction.

Figure 5:
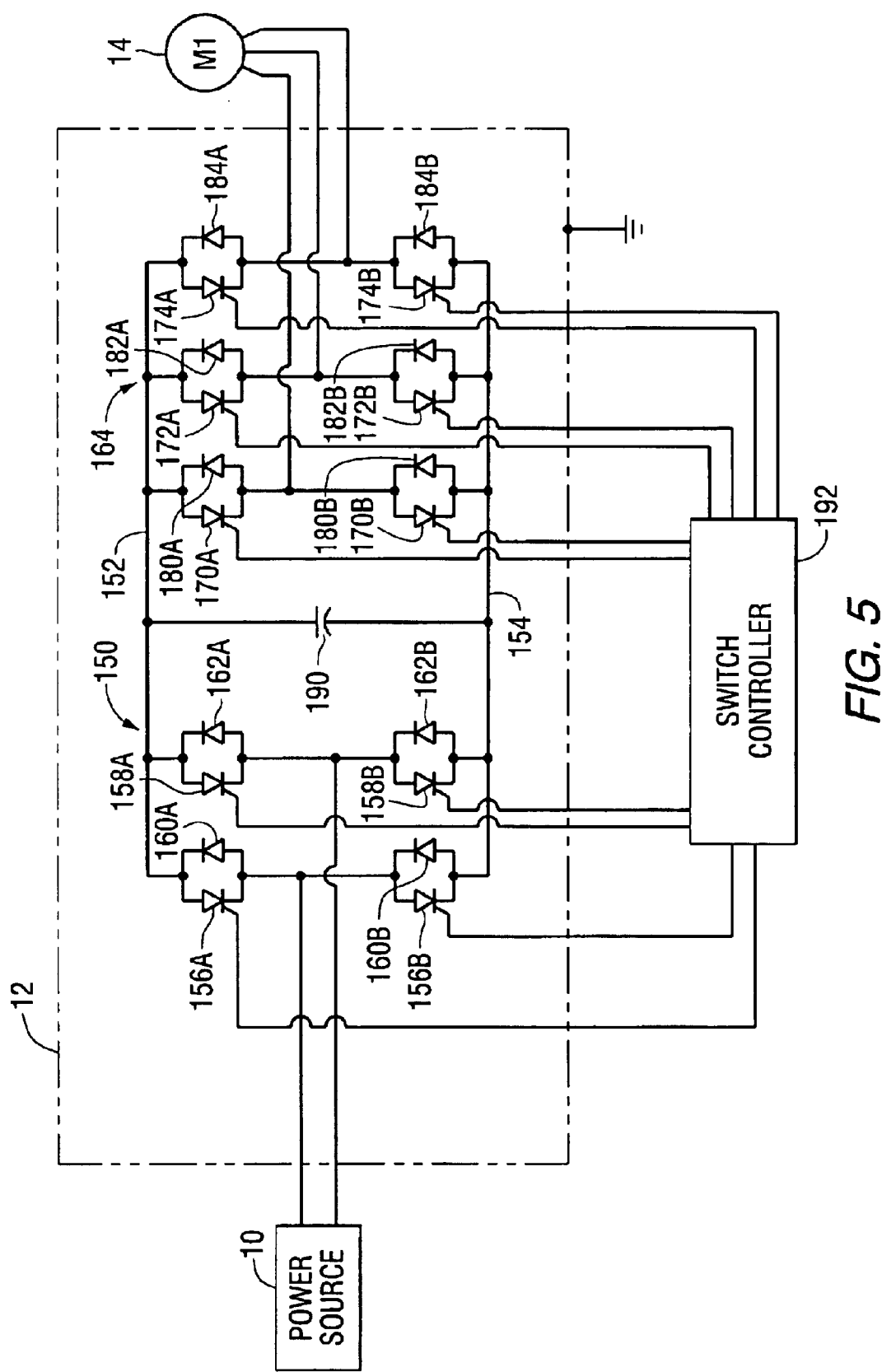
FIG. 5 is a schematic diagram of the inverter 12.

An exemplary inverter 12 is illustrated in FIG. 5 and typically finds application for vehicles supplied with power from an AC source for driving DC traction motors. Transit vehicles supplied with single-phase AC current from a catenary system typically use such an inverter. An AC power source 10 supplies power to the inverter 12, which comprises a pulse-width modulated rectifier 150 and an inverter 164. The rectifier 150 includes two pairs of series connected switching devices coupled across a relatively positive bus 152 and a relatively negative bus 154. The first pair of series connected switching devices includes gate turn-off devices 156A and 156B. The second pair of series connected switching devices includes gate turn-off devices 158A and 158B. Each of the gate turn-off devices 156A, 156B, 158A and 158B is bypassed by a parallel connected reversely poled diode 160A, 160B, 162A and 162B, respectively. It is known that IGBT's (insulated gate bipolar transistors) or other power switching devices can be used in lieu of each of the gate-turn-off devices.

In other applications where the input power supplied to the vehicle is DC (such as DC power supplied from a third-rail to a transit vehicle), the rectifier 150 is not required. In most locomotive and other off-highway vehicles driven by a diesel engine, the power supplied to the inverter is three-phase alternating current, and a simple diode rectifier is used to rectify each phase to DC, instead of the gate turn-off devices illustrated above.

The inverter 164 comprises a conventional three-phase inverter of a type well known in the art. Each phase of the inverter 164 is identical and comprises a pair of series connected switching devices with reversely poled diodes connected in parallel therewith. With reference to FIG. 5, series connected gate turnoff devices 170A and 170B are by-passed by parallel connected and reversely poled diodes 108A and 108B respectively. Series connected gate turnoff devices 172A and 172B are by-passed by parallel connected and reversely poled diodes 182A and 182B, respectively. Series connected gate turnoff devices 174A and 174B are by-passed by parallel connected and reversely poled diodes 184A and 184B. The junction intermediate each pair of the series-connected switching devices is connected to a respective phase winding of the motor 14, as shown. By gating the switching devices of the inverter 164, that is the gate turnoff devices 170A, 170B, 172A, 172B, 174A and 174B, into conduction at predetermined times, a voltage that approximates a sine wave is developed at the junction intermediate each of the series-connected gate turnoff device pairs for powering the motor 14.

The function of the inverter 12 as depicted in FIG. 5, is to supply phase winding current to the motor 14 for inducing rotation therein to supply tractive power to the vehicle 30. With respect to the present invention, during non-operational periods it is desirable to switch DC power to the motor 14 via the inverter 12 so as to calculate the motor resistance by measuring the average voltage across the winding and the average current through the winding. As will be described below, from the motor resistance, the motor temperature can be estimated for comparison with the predicted temperature determined at the step 138 of the motor thermal protection algorithm 107.

Figure 6:
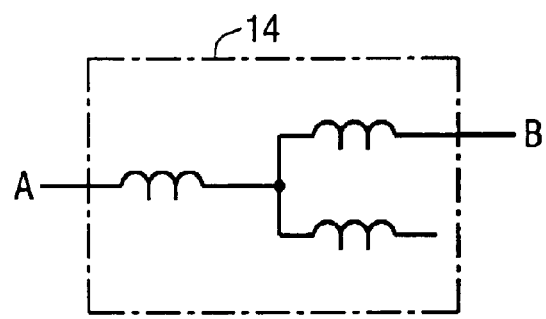
FIGS. 6 and 7 illustrate to motor winding types.
Figure 7:
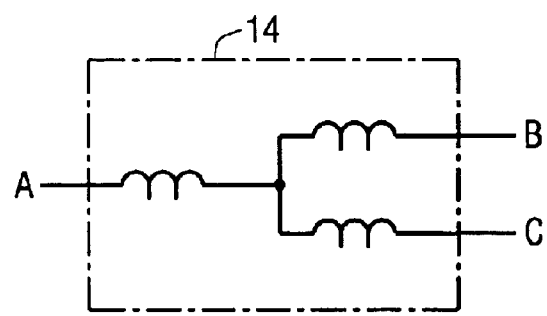

FIGS. 6 and 7 illustrate embodiments for the motor 14 that can be used in conjunction with the present invention. In the FIG. 6 embodiment, current is supplied only to the phase A and phase B windings. In the FIG. 7 embodiment current is supplied to all three windings, A, B and C.

Figure 8:
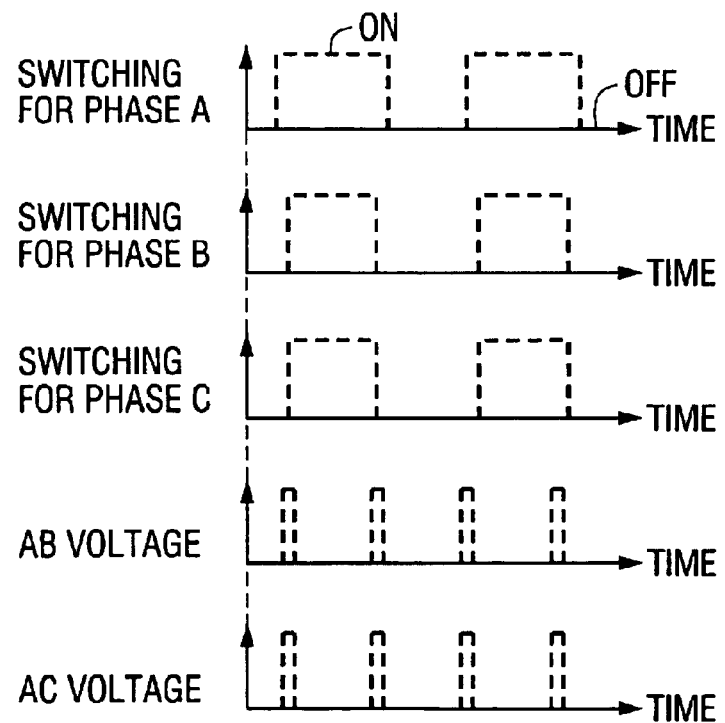
FIG. 8 is a timing diagram for controlling the inverter 12 of FIG. 5.

FIG. 8 depicts the time line illustrating the process of switching on and off the gate turn-off devices so as to supply a current to the AC traction motor 14 for measuring resistance thereof, from which an average temperature can be derived. The switching is controlled by a switch controller 192 shown in FIG. 5. According to FIG. 8, the gate turnoff devices 170A, 172A and 174A are turned on when the switching signal for phase A, B and C (respectively) is positive, and the gate turnoff devices 170B, 172B and 174B are off. The situation is reversed when the switching signal is at a zero or off value, that is, the gate turnoff devices 170A, 172A and 174A are off, and the gate turnoff devices 170B, 172B and 174B are on. The resulting current input to the AC traction motor 14 as the gate turnoff devices cycle on and off is substantially DC (if the pulse width remains constant as shown in FIG. 8) because the chopping frequency is high compared to the time constant of the traction motor 14, which is determined by the motor resistance and inductance. It is critical that no AC power is supplied to the AC traction motors during this hot resistance measurement test, as such will cause the motors to turn and movement of the vehicle.

With reference to FIG. 8, during periods when each of the windings receives a pulse, i.e., is connected to the positive DC voltage on the positive bus 152 (See FIG. 5) or each of the windings receives no pulse, i.e., is connected to the negative DC voltage on the negative bus 154 (FIG. 5), the net voltage applied to the AC traction motor 14 is zero. During periods when one winding receives a pulse (is connected to the positive DC voltage) and one or more of the other windings does not receive a pulse (is connected to the negative DC voltage) the resulting motor voltage will produce a substantially DC current if the pulse width remains constant (as depicted in FIG. 8) due to the relationship between the frequency of the DC pulses and the motor time constants. Thus, as can be seen from the FIG. 8 diagrams, one of the motor windings is responsive to a different pulse width (on time) than the other two windings. The length of the time that the current is supplied to the phase A winding is slightly longer then the length of time current is supplied to the phase B and C windings. Hence, the net voltage applied to the AC traction motor 14 is determined by the difference in pulse width of the phase A winding current from that of the phase B and C windings. Thus continuous variation of the on time of the pulses is possible without regard to the on-time constraint of a gate turnoff device. For example if the phase A winding is on for 1000 microseconds and the phase B and C windings are on for 999 microseconds, the net pulse width will be one microsecond, but none of the pulses supplied to the phase A, phase B and phase C windings is less than the minimum on time of a gate turnoff device, which, for example is about 100 microseconds. The voltage is produced by the phase winding current. The voltage AB between the A and B phase windings and the voltage AC between the A and C phase windings are also illustrated in FIG. 8.

In certain motor designs the neutral point common to the three windings is not connected to ground thus the supply of DC (or substantially DC) power to two or three windings is required to measure the hot resistance. In other motor designs where the neutral common point is connected to ground, it would be possible to supply DC power to each or any of the three windings, using the ground as a return path, to determine the hot resistance.

The traction motor resistance can be calculated when current is flowing through the motor by measuring the average voltage across the winding and the average current through the winding. The resistance then is the voltage divided by the current. In the FIG. 6 embodiment of the AC traction motor 14, wherein only two windings receive current, the resistance calculated using the voltage and current provides a value that is twice the line-to-neutral resistance. For the FIG. 7 winding configuration, where all three windings receive current, the resistance calculated using the voltage and the current provides a value that is 1.5 times the line to neutral resistance.

Although it is possible to use only a single current and voltage measurement through any two windings to determine the resistance, it is preferable to make a series of such measurements and average the results. For example, six measurements can be made by sending the current through windings A to B, B to A, A to C, C to A, B to C and C to B. The averaged result generally provides a more accurate resistance value.

In one embodiment of the present invention, each combination of pulse width switching processes is implemented for 20 seconds for each of the paired windings identified above. The motor temperature is calculated by averaging the voltage and current over the last 19 seconds (to eliminate transient effects) of each pulse combination. The average motor resistance is then obtained by averaging the 19 second averages for each of the six pairs of windings. From that resistance value, the temperature is calculated in accordance with equation (3) above.

Alternatively, instead of measuring the average voltage as above, it can be calculated from the DC link voltage and the pulse width of each of the gate turnoff devices. For example, the AB pulse width of FIG. 8 is one microsecond and it occurs once in each 1000 microsecond interval. The average voltage is therefore the DC link voltage multiplied by the pulse duty cycle. In this case, the average DC voltage is then $VDC*1/1000$.

Once the motor resistance is calculated, the motor temperature can be estimated from the following equation:

$$R2=R1(1+K(T2-T1)) \quad (2)$$

or rearranging terms, $$T2=(1/K)[(R2/R1)-1]+T1 \quad (3)$$

Where R1 is the resistance of the motor at a known temperature T1 (such as zero degrees Celsius), K if the thermal coefficient of the motor, R2 is the resistance calculated from the measured voltage and current (R2=V/1) and T2 is the motor temperature.

Note that equation (3) provides an average motor, or more precisely, an average stator winding temperature, while the motor thermal protection algorithm 107 predicts temperatures at several nodes within the motor. The average and nodal temperatures are compared with some qualitative knowledge of the expected relationship between them. For example, a certain nodal temperature value, based on the location of the node, is expected to be no more than 20% above the average estimated temperature. If the difference is more than 20% then a cooling system problem is suspected.

As an alternative to the application of substantially DC current to the stator windings to determine the average motor temperature, the average rotor resistance can be determined from the rotor slip, as discussed below, and then the resistance value plugged into equation (3) above to determine an average motor, more specifically, an average rotor temperature. Generally, the rotor slip is the difference between the frequency at which the gate turn on devices are fired to excite the windings (the electrical frequency) and the speed of the rotor. Alternatively, the resistance can be determined from the rotor torque, which is the product of the voltage and the current, or the power. Those skilled in the art are aware that there are a number of equations, based on various equivalent circuits, from which the rotor resistance can be calculated from the rotor slip. Two such equations are given below $$Resistance=k*slip*flux/(torque\ producing\ current)$$

or $$Resistance=k*torque*(slip\ frequency)/(rotor\ current^2)$$

These equations and the techniques for measuring and determining the variables set forth are well known in the art. See in particular, *Power Electronics and AC Drives*, by B. K. Bose.

Figure 9:
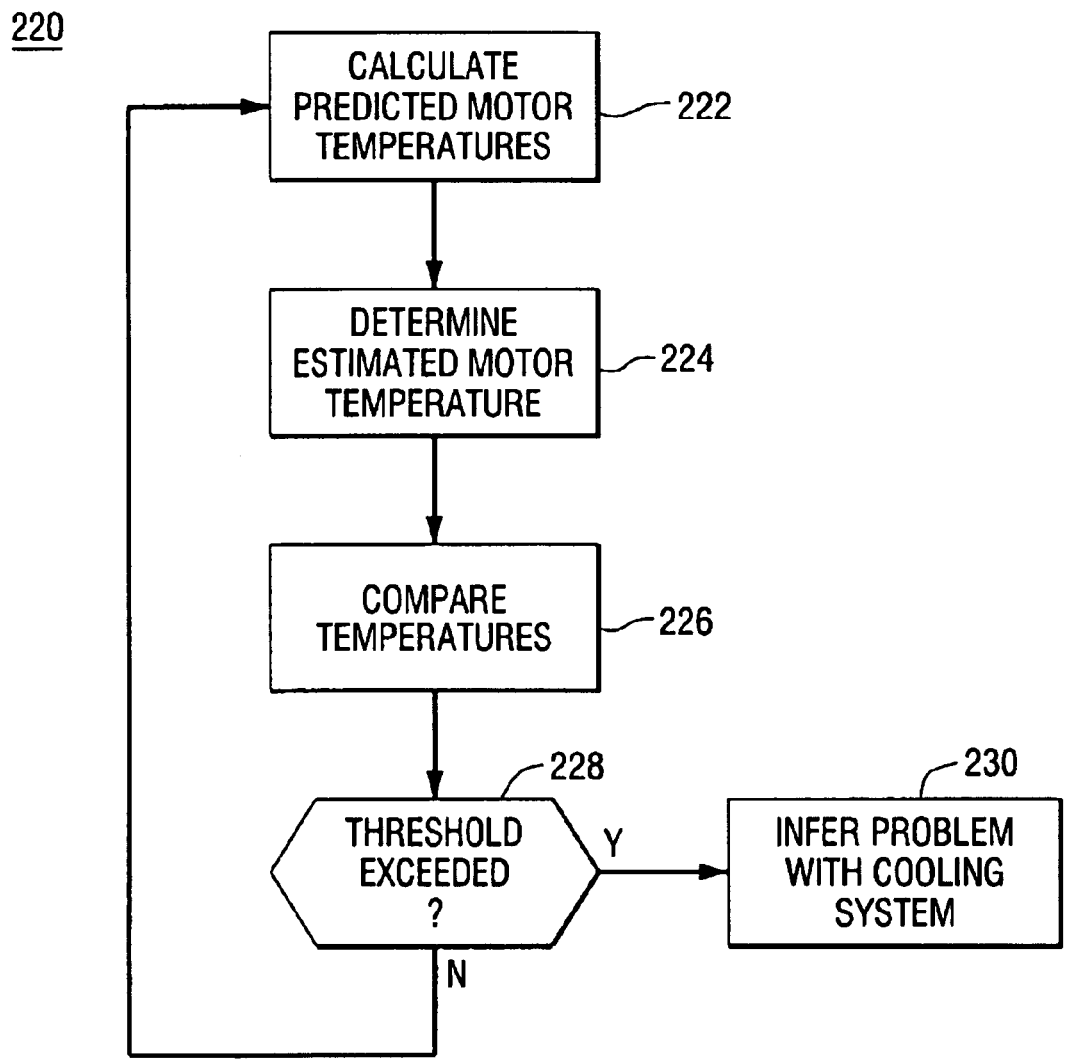
FIG. 9 is a flow chart for determining whether cooling air is supplied to the motors in accordance with the teachings of the present invention.

Referring to FIG. 9, there is shown a process 220 for determining whether the cooling system is providing air flow to the AC traction motor 14. The process 220 can be executed by any microprocessor (and associated memory) operative on the vehicle 30. In one embodiment, the processor within the propulsion system controller 18 can execute the process 220. At a step 222 the predicted motor temperature is calculated using the motor thermal protection algorithm 107 as set forth in FIG. 3. At a step 224, the motor temperature is estimated according to equation (3) above, with the resistance value in equation (3) determined, as discussed above, by DC injection (then measuring the DC current and voltage and deriving the resistance therefrom) or by measuring the rotor slip, (from which the resistance can be determined as described above). Alternatively, the resistance can be determined by the injection of an AC signal into the motor. The resistance equals the injected AC voltage divided by the in-phase component of the AC current.

At a step 226 the predicted motor temperature and the estimated motor temperatures are compared. At a decision step 228, a determination is made whether the difference exceeds a predetermined threshold. This threshold value is established so that differences in excess of this value are indicative of a potential cooling system problem. If the threshold is exceeded, then the cooling system requires a physical inspection by a technician to diagnose the cause of the difference between the predicted and the estimated temperature values.

It is known to those skilled in the art that a railroad locomotive, which is exemplary of the vehicles 32 to which the present invention can be applied, includes a blower directing cooling air to the locomotive traction motors. The blower draws ambient air into the locomotive and forces it into a cooling duct. A manifold is interposed within the duct for directing air from the main duct to individual ducts that direct the cooling air to individual traction motors. Thus if the estimated motor temperature exceeds the predicted motor temperature, a cooling system problem is usually at fault. According to the teachings of the present invention, if the threshold value is exceeded at the decision step 228, the processing moves to a step 230 where a problem with the cooling system can be inferred. Potential causes for this problem include: a break in the primary cooling duct upstream from the manifold or in one or more secondary cooling ducts between the manifold and the traction motors or a clogged or a leaky duct. Recall that the algorithm for predicting the motor temperature utilizes a pre-selected value for cooling air flow to each of the traction motors. If this cooling air is not being supplied to each traction motor, then the estimated temperature will exceed the predicted temperature.

The process 220 is executed for each traction motor. If only a single traction motor has a cooling problem as a result of execution of the process 220, then likely the problem resides in that portion of the cooling duct between the manifold and the overheating traction motor. In the event more than one traction motor has an estimated temperature in excess of the predicted temperature, then a common cooling system problem is indicated. For example, the blower may have stopped operating or there may be an obstruction within the primary duct. In any case, the result of the process 220, when executed for each of the traction motors, provides important information as to the condition of the cooling system for each of those motors.

An estimate of the motor temperature can be accomplished only when the locomotive or vehicle 30 is at a stop, (unless the alternative rotor slip process is utilized) because it is only at this time that a DC current can be applied to the traction motor windings for measuring the resistance and thus calculating the motor temperature. Those skilled in the art recognize that the time constant for traction motor cool down is relatively long and therefore, the process described herein for determining the motor temperature provides a reasonably accurate motor temperature value so long as the process is executed shortly after the vehicle is brought to a stop. The motor temperature value estimated at that time fairly represents the operating motor temperature and therefore can be compared with the predicted temperature as set forth in the process 220. Generally, a motor winding does not fail if the temperature exceeds a predetermined limit, but rather these temperature excursions reduce the life of the motor windings. Therefore, it is not necessary to monitor the actual motor temperature and compare it to the predicted temperature on a continuous basis. A periodic analysis and a subsequent check of the cooling system if warranted, is sufficient.

While only certain preferred features of the invention have been illustrated and described herein, many modifications and changes will occur to those skilled in the art. It is therefore, to be understood that the appended claims are intended to cover all such modifications and changes that fall within the spirit of the invention.

What is claimed is:

1. A method for determining the health of a cooling system on a vehicle driven by at least one electric traction motor coupled to a wheel for the vehicle, with the cooling system directing cooling air past the traction motor, the method comprising:

monitoring the temperature and pressure of the air available to the cooling system for cooling the traction motor;
    monitoring operating parameters of the traction motor;
    estimating motor beat losses generated by the operation of the motor based on the motor operating parameters, and motor cooling by operation of the cooling system based on the temperature and pressure of the air available to the cooling system;
    establishing an estimated motor temperature based on the estimated heat losses and cooling;
    monitoring electrical power input parameters to the electric traction motor, including voltage and current;
    determining the electrical resistance of the motor winding;
    calculating a motor temperature indicative of the actual motor temperature based on the electrical resistance of the motor winding;
    comparing the calculated actual motor temperature and the estimated motor temperature; and
    determining if the calculated actual motor temperature exceeds the estimated motor temperature by more than a predetermined amount.

2. The method of claim 1 further comprising giving notice that the cooling system may be defective if the calculated actual motor temperature exceeds the estimated motor temperature by more than the predetermined amount.

3. The method of claim 1 wherein the vehicle comprises a plurality of electric traction motors and the method Further comprising estimating an estimated motor temperature and calculating an actual motor temperature for each motor.

4. The method of claim 3 further comprising comparing the respective estimated motor temperature and calculated actual motor temperature for each motor.

5. The method of claim 4 further comprising determining if the calculated actual motor temperature exceeds the estimated motor temperature by more than a predetermined amount for each motor.

6. The method of claim 5 further comprising determining if the calculated actual motor temperature exceeds the estimated motor temperature by more than the predetermined amount for more than one motor.

7. The method of claim 5 wherein the cooling system provides cooling air to more than one electric traction motor on the vehicle, and the method further comprises giving notice that an element of the cooling system common to the motors cooled by the cooling system may be defective, if the calculated actual motor temperature exceeds the estimated motor temperature by more than the predetermined amount for more than one motor.

8. The method of claim 1 wherein the resistance of the motor windings is determined by applying DC power to the motor winding and measuring the voltage across the motor winding and the current through the motor winding.

9. The method of claim 8 wherein the electric traction motor is an AC motor, and DC power is applied to the motor when the vehicle is stopped.

10. The method of claim 1 wherein the resistance of the motor windings is determined from a rotor slip process.

11. The method of claim 1 wherein the traction motor has at least two phase windings, with each phase winding coupled by a first respective combination of a first switch and a first diode to a positive voltage line and a second respective parallel combination of a second switch and a second diode to a negative voltage line, and wherein the step of monitoring electrical power input parameters further comprises:

supplying voltage to the positive and negative voltage lines; and switching on and off selected ones of the first and second switches to provide DC current to the motor;

determining the voltage across a motor winding and a current through the motor winding, and wherein the step of determining the electrical resistance further comprises determining the electrical resistance in response to the determined voltage and current.

12. The method of claim 1 wherein the traction motor comprises an AC traction motor.

13. An apparatus for determining the health of a cooling system on a vehicle driven by at least one electric traction motor coupled to a wheel for the vehicle, with the cooling system directing cooling air past the traction motor, the apparatus comprising:

at least one ambient sensor for monitoring the temperature and pressure of the air available to the cooling system for cooling the traction motor;

at least one motor sensor for monitoring operating parameters of the traction motor;

a processing unit operative in response to the at least one ambient sensor for estimating motor heat losses generated by the operation of the motor, operative in response to the at least one motor sensor for estimating motor cooling by operation of the cooling system, and for establishing an estimated motor temperature based on the estimated heat losses and the cooling;

a processing unit for determining the electrical resistance of the motor winding and for calculating a motor temperature indicative of the actual motor temperature based on the electrical resistance;

a circuit for determining whether the calculated actual motor temperature exceeds the estimated motor temperature by more than a redetermined amount.

14. The apparatus of claim 13 further comprising at least one electrical sensor for monitoring electrical power input parameters to the electric traction motor, including voltage and current, wherein the processing unit for determining the electrical resistance of the motor winding is operative in response to the at least one electrical sensor for calculating a motor temperature indicative of the actual motor temperature based on the electrical resistance.

15. The apparatus of claim 13 further comprising a circuit for determining rotor slip, wherein the processing unit for determining the electrical resistance of the motor winding is operative in response to the circuit for determining the electrical resistance of the motor.

16. An article of manufacture comprising:

a computer product comprising a computer-usable medium having a computer-readable code therein for determining the health of a cooling system on a vehicle driven by at least one electric traction motor coupled to a wheel for the vehicle, with the cooling system directing cooling air past the traction motor, the method comprising:

a computer-readable program code module for monitoring the temperature and pressure of the air available to the cooling system for cooling the traction motor;

a computer-readable program code module for monitoring operating parameters of the traction motor;

a computer-readable program code module for estimating motor heat losses generated by the operation of the motor based on the motor operating parameters, and motor cooling by operation of the cooling system based on the temperature and pressure of the air available to the cooling system;

a computer-readable program code module for establishing an estimated motor temperature based on the estimated heat losses and cooling;

a computer-readable program code module for monitoring electrical power input parameters to the electric traction motor, including voltage and current;

a computer-readable program code module for determining the electrical resistance of the motor winding;

a computer-readable program code module for calculating a motor temperature indicative of the actual motor temperature based on the electrical resistance of the motor winding;

a computer-readable program code module for comparing the calculated actual motor temperature and the estimated motor temperature; and a computer-readable program code module for determining if the calculated actual motor temperature exceeds the estimated motor temperature by more than a predetermined amount.

* * * * *